US007398109B2

(12) United States Patent
Parra et al.

(10) Patent No.: US 7,398,109 B2
(45) Date of Patent: Jul. 8, 2008

(54) WIRELESS LAN BASE STATION DEVICE HAVING ANTENNAS AND TRANSMISSION-RECEPTION PORTION (75) Inventors: Fidol Joaquin Parra, Kanagawa (JP); Yoshikazu Kobayashi, Kanagawa (JP)

(73) Assignee: NEC Infrontia Corporation, Kanagawa (JP)

(*) Notice: Subject to any disclaimer, the term of this patent is extended or adjusted under 35 U.S.C. 154(b) by 607 days.

(21) Appl. No.: 10/678,232

(22) Filed: Oct. 6, 2003

(65) Prior Publication Data
US 2004/0087344 A1 May 6, 2004

(30) Foreign Application Priority Data
Nov. 1, 2002 (JP) ............................. 2002-319785

(51) Int. Cl.
*H04M 1/00* (2006.01)
*H04B 7/00* (2006.01)
*H04B 17/00* (2006.01)

(52) U.S. Cl. .................... 455/562.1; 455/524; 455/560; 455/525; 455/277.1

(58) Field of Classification Search ................ 455/525, 455/524, 562.1, 561, 560, 226, 67.11, 550.1, 455/277.1, 103
See application file for complete search history.

(56) References Cited

U.S. PATENT DOCUMENTS

| 5,978,675 | A  | * | 11/1999 | Niemela ..................... 455/423 |
| 6,122,505 | A  | * | 9/2000  | Genell et al. ................. 455/423 |
| 6,215,982 | B1 | * | 4/2001  | Trompower ................ 455/63.3 |
| 6,266,531 | B1 | * | 7/2001  | Zadeh et al. ................. 455/453 |
| 6,470,184 | B1 | * | 10/2002 | Machida ...................... 455/453 |
| 6,542,742 | B2 | * | 4/2003  | Schramm et al. ............. 455/436 |
| 7,133,666 | B2 | * | 11/2006 | Arai ............................ 455/421 |
| 2002/0081977 | A1 | * | 6/2002  | McCune, Jr. ............... 455/67.1 |

FOREIGN PATENT DOCUMENTS

| JP | 7-193848    | 7/1995  |
| JP | 9-74585     | 3/1997  |
| JP | WO 97/44978 | 11/1997 |
| JP | 10-164637   | 6/1998  |
| JP | 10-256970   | 9/1998  |
| JP | 11-239091   | 8/1999  |

(Continued)

OTHER PUBLICATIONS

English translation of Japanese Office Action issued Sep. 22, 2005.

(Continued)

*Primary Examiner*—Tilahun B Gesessse
(74) *Attorney, Agent, or Firm*—Dickstein Shapiro LLP (57) ABSTRACT In a wireless LAN base station device including plural antennas for making communications with a wireless terminal, plural transmission-reception portions connected to the plural antennas, plural control processors for controlling the plural transmission-reception portions, and a central processor for controlling the plural control processors, each transmission-reception portion measures a reception level or/and each control processor measures a communication error occurrence rate, and the central processor controls the plural control processors to select a transmission-reception portion so that the reception level is maximum or/and the communication error occurrence rate is minimum. The control processors cease prescribed transmission-reception portions for a time zone in which the communication load is low.

11 Claims, 9 Drawing Sheets

FOREIGN PATENT DOCUMENTS

| | | |
|---|---|---|
| JP | 11-252626 | 9/1999 |
| JP | 11-331932 | 11/1999 |
| JP | 11-341540 | 12/1999 |
| JP | 2001-25047 | 1/2001 |
| JP | 2001-203625 | 7/2001 |
| JP | 2002-112324 | 4/2002 |

OTHER PUBLICATIONS

Japanese Office Action issued Dec. 26, 2005 (w/ English translation of relevant portions).

* cited by examiner

FIG.1

ELECTRIC WAVE ARRIVAL
RANGE OF EACH ANTENNA

ELECTRIC WAVE ARRIVAL
RANGE OF ALL ANTENNAS

COMMUNICATION START STATE FROM WIRELESS TERMINAL

FIG.3B

STATUS UNDER COMMUNICATION

COMMUNICATION TABLE EXAMPLE: COMMUNICATION IS MADE BY TRANSMISSION-RECEPTION PORTION No.1 AT PRESENT, CANDIDATE: TRANSMISSION-RECEPTION PORTION No.2

| TERMINAL NUMBER | RECEPTION LEVEL | ERROR OCCURRENCE RATE | TRANSMISSION-RECEPTION PORTION NUMBER |
|---|---|---|---|
| 1 | 250 | 1/1000 | 1 |
| 1 | 120 | — | 2 |

FIG.6A

STATE BEFORE SWITCHING METHOD

MAXIMUM LEVEL ANTENNA SEARCHED BY CPU

CURRENTLY-COMMUNICATING LEVEL ANTENNA

FIG.6B

DURING SWITCHING METHOD

COMMUNICATIONS BY BOTH TRANSMISSION-RECEPTION PORTIONS

FIG.6C

SWITCHING METHOD COMPLETED

COMMUNICATIONS BY MAXIMUM LEVEL ANTENNA

WIRELESS LAN BASE STATION DEVICE HAVING ANTENNAS AND TRANSMISSION-RECEPTION PORTION

BACKGROUND OF THE INVENTION

1. Field of the Invention

The present invention relates to a wireless Local Area Network (LAN) base station device and a communication method therefor and particularly, to a wireless LAN base station device having plural antennas for making communications with wireless terminals and plural transmission-reception portions connected to the plural antennas, and a communication method therefor.

2. Description of the Related Art

JP-A-11-239091 (hereinafter referred to as "patent document 1") discloses an example of the construction of a wireless base station device in which an antenna unit for expanding a wireless-communication possible area of a wireless base station is arranged in the neighborhood of the wireless-communication possible area of the wireless base station or out of the wireless-communication possible area by connecting to the wireless base station through an RF signal coaxial cable when it is difficult to make wireless communications with the wireless base station although the distance to the wireless base station is actually near in the Personal Handyphone System (PHS) system.

Furthermore, JP-A-11-341540 discloses that in a cellular phone system a cell is divided into plural sectors, each sector is covered by using at least three antennas while parts of the coverage areas of two antennas of these three antennas are overlapped with each other and an antenna which provides the maximum level to a reception signal from a mobile is selected as a main antenna on the basis of an instruction of the mobile.

However, the wireless base station device and cellular phone system described above are inadequate for enabling a wireless terminal to move with no interruption of communication, energy saving, etc.

SUMMARY OF THE INVENTION

A wireless LAN base station device according to the present invention includes plural antennas for making communications with a wireless terminal, plural transmission-reception portions connected to the plural antennas, plural control processors for controlling the plural transmission-reception portions, and a central processor for controlling the plural control processors, wherein each transmission-reception portion measures a reception level or/and each control processor measures a communication error occurrence rate, and the central processor controls the plural control processors to select a transmission-reception portion so that the reception level is maximum or/and the communication error occurrence rate is minimum.

Furthermore, a wireless LAN base station device according to the present invention comprises plural antennas for making communications with a wireless terminal, plural transmission-reception portions connected to the plural antennas, plural control processors for controlling the plural transmission-reception portions, and a central processor for controlling the plural control processors, wherein the central processor controls the plural control processors so that prescribed transmission-reception portions are paused for a time zone in which the communication load is low.

Still furthermore, a communication method for a wireless LAN base station device including plural antennas for making communications with a wireless terminal, plural transmission-reception portions connected to the plural antennas, and plural control processors for controlling the plural transmission-reception portions, wherein the control processors pause prescribed transmission-reception portions for a time zone in which the communication load is low.

DETAILED DESCRIPTION OF THE PREFERRED EMBODIMENT

A preferred embodiment according to the present invention will be described hereunder with reference to the accompanying drawings.

Figure 1:
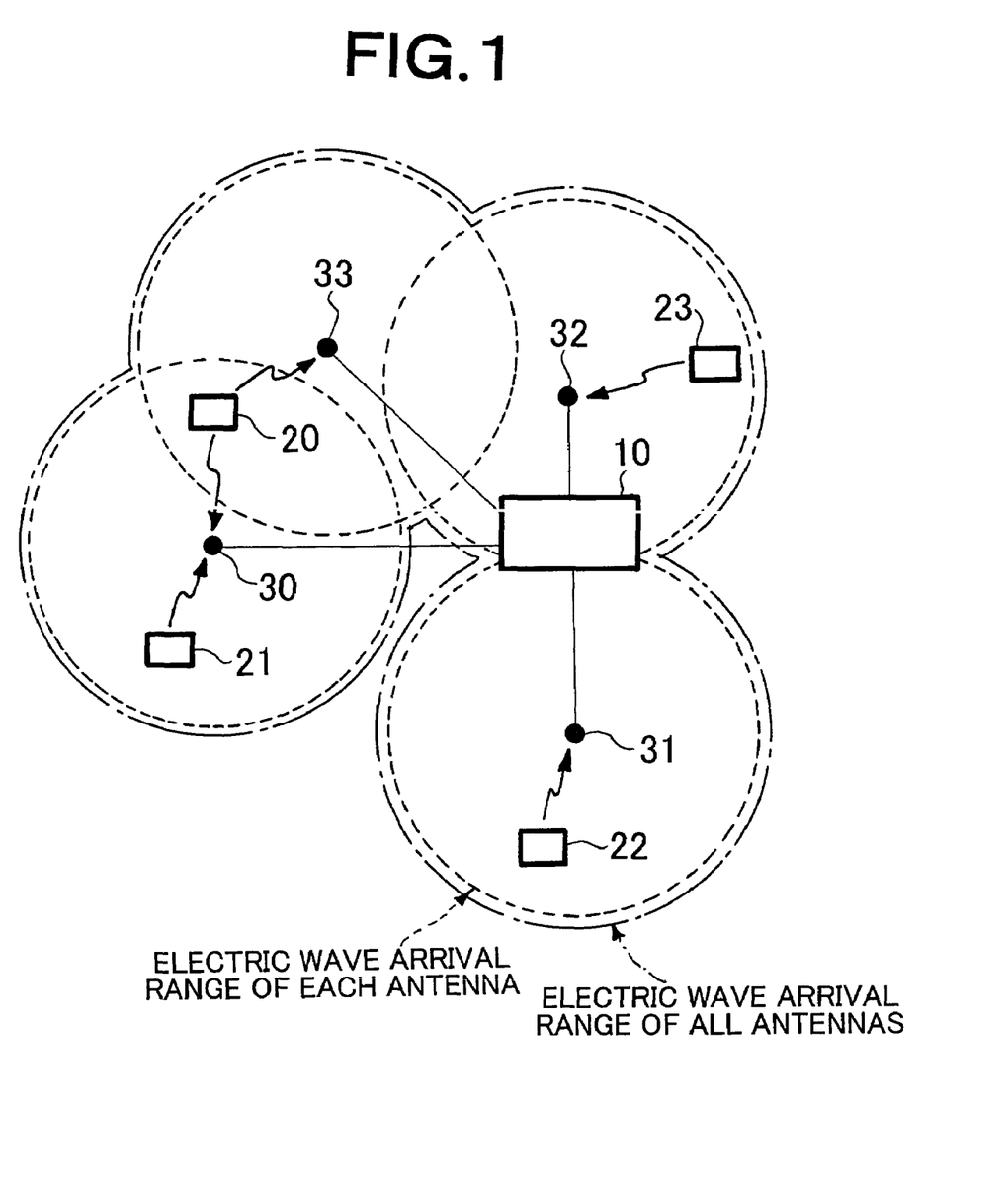
FIG. 1 is a schematic diagram showing the construction of a communication system using a wireless LAN base station device according to the present invention.

FIG. 1 schematically shows the construction of a communication system using a wireless LAN base station device according to the present invention.

The wireless LAN base station device according to this embodiment is equipped with antennas 30 to 33, and access point device 10. By providing plural antennas as described above, the transmissible/receivable range can be broadened or a transmission/reception pattern at only proper places can be implemented. In this case, it is assumed that the electric wave arrival range of the antenna 30 and the electric wave arrival range of the antenna 33 are overlapped with each other, and the electric wave arrival range of the antenna 32 and the electric wave arrival range of the antenna 33 are overlapped with each other. Wireless terminal 21 is located in the electric wave arrival range of the antenna 30, wireless terminal 23 is located in the electric wave arrival range of the antenna 32, wireless terminal 22 is located in the electric wave arrival range of the antenna 31 and wireless terminal 20 is located in the overlapped range between the electric wave arrival range of the antenna 30 and the electric wave arrival range of the antenna 33.

As shown in FIG. 1, when the wireless terminal 20 is located in the overlapped range between the electric wave arrival ranges of the antennas 30 and 33, an antenna switching operation is carried out in accordance with variation of the communication level or/and the error occurrence rate so that transmission/reception information between the wireless terminal 20 and the access point device 10 can be communicated at the maximum reception level or/and at the minimum communication error occurrence rate. Furthermore, an operation of pausing (suspending) the transmission/reception of transmission-reception portions connected to unused antennas other than a switched antenna for a predetermined period is carried out to save the energy.

Figure 2:
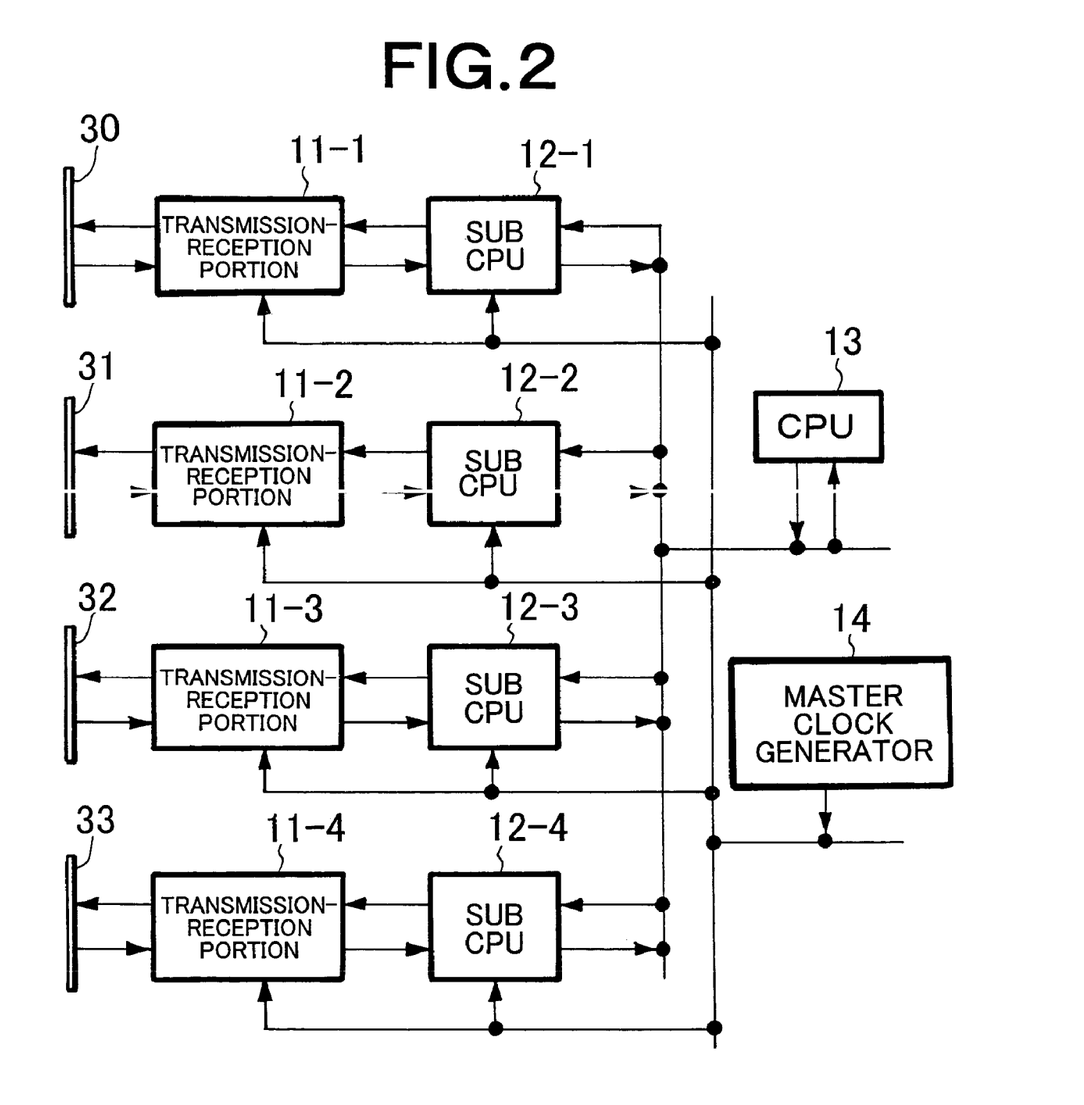
FIG. 2 is a diagram showing the construction of an embodiment of the wireless LAN base station device according to the present invention.

FIG. 2 is a diagrams showing the construction of the embodiment of the wireless LAN base station device according to the invention.

As shown in FIG. 2, the wireless LAN base station device according to this embodiment comprises antennas 30 to 33, transmission-reception portions 11-1 to 11-4 for exchanging transmission/reception information with the wireless terminals 20 to 23 through the antennas 30 to 33, control processing units (Sub-CPUs) 12-1 to 12-4 for carrying out the normal operation of the transmission-reception portions and the signal control processing, central processing unit (CPU) 13 for carrying out the control processing of the control processing units 12-1 to 12-4, and master clock generator 14 for transmitting clock signals for signal synchronization to the transmission-reception portions 11-1 to 11-4 and the control processing units 12-1 to 12-4.

Each wireless terminal is capable of emitting a communication start request message. Furthermore, the reception level described above is measured by the receiver of the transmission-reception portion, and the error occurrence rate described above is calculated by the control processing unit (Sub-CPU).

The control processing of the device is executed in the central processing unit (CPU) 13. The central processing unit 13 is provided with a communication start allowing function, a communication monitoring function and a transmission/reception switching function. These functions are transmitted as operation messages to control processing units (Sub-CPUs) 12-1 to 12-4.

Figure 11:
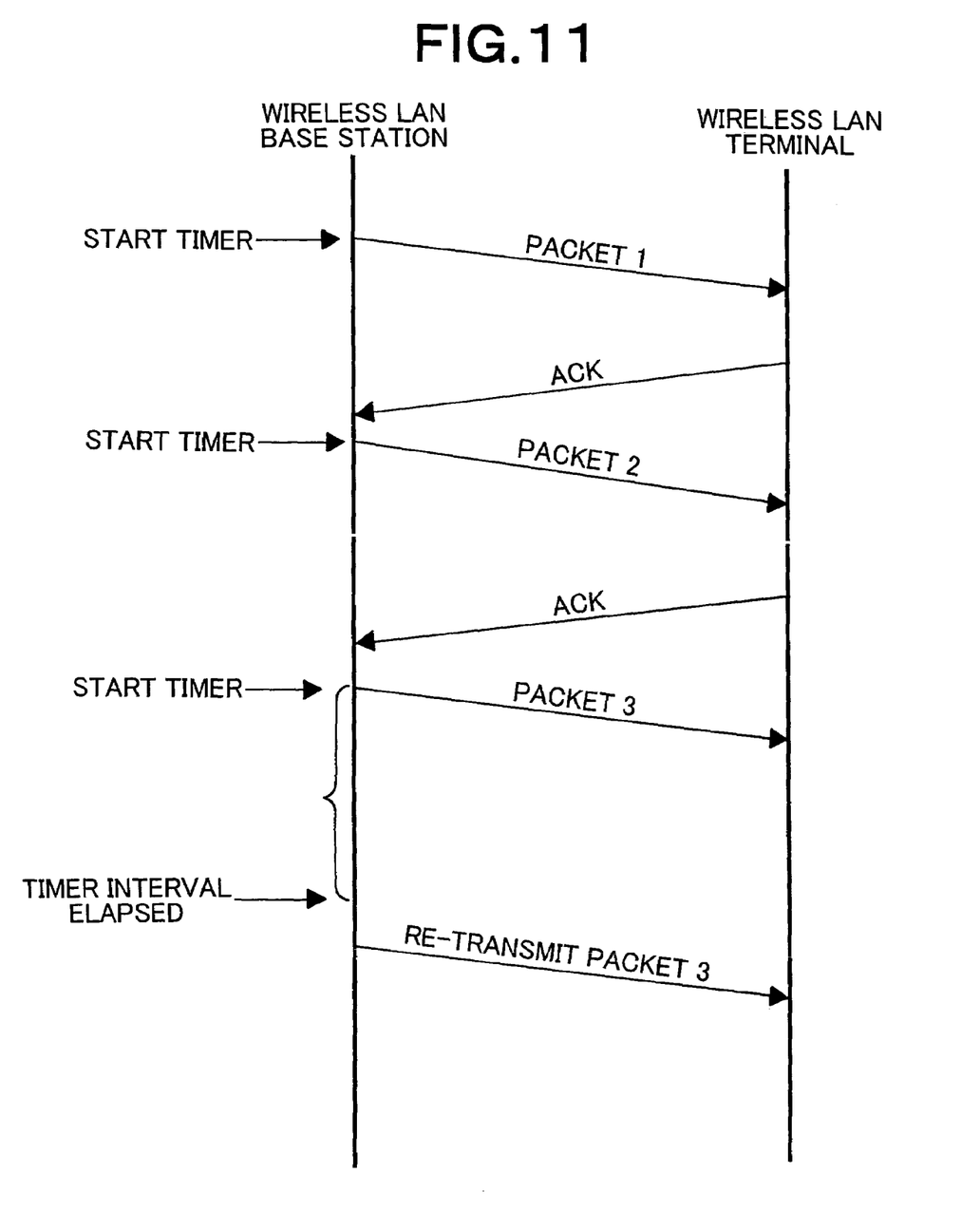
FIG. 11 is a diagram showing a method of calculating error occurrence rate.

Here, a method of calculating the error occurrence rate will be described with reference to FIG. 11. FIG. 11 is a diagram showing a communication state between the wireless LAN base station and the wireless LAN terminal.

In FIG. 11, communication information packet 1 is transmitted from the wireless LAN base station to the wireless LAN terminal, and the wireless LAN terminal transmits ACK (OK) message. The transmission-reception portion (or sub-CPU) of the wireless LAN base station has a timer, and waits for the ACK(OK) message from the wireless LAN terminal on the basis of a set time of the timer. When receiving the ACK(OK) message associated with the communication information packet 1, the transmission-reception portion of the wireless LAN base station transmits a next communication information packet 2, and waits for ACK(OK) message likewise. When receiving the ACK(OK) message associated with the communication information packet 2, the transmission-reception portion of the wireless LAN base station transmits a next communication information message 3, and waits for ACK(OK) message likewise. When receiving no ACK (OK) message associated with the communication information packet 3 within the set time of the timer, the wireless LAN base station re-transmits the communication information packet 3.

As described above, the packets 1, 2 and 3 and the re-transmitted packet 3, that is, totally four packets are transmitted from the wireless LAN base station, and one packet has not been transmitted. Therefore, according to the calculation result of the error occurrence rate, the error occurrence rate is equal to $\frac{1}{4}=0.25$.

Description of Operation

The operation of the wireless LAN base station device will be described.

Figure 3A:
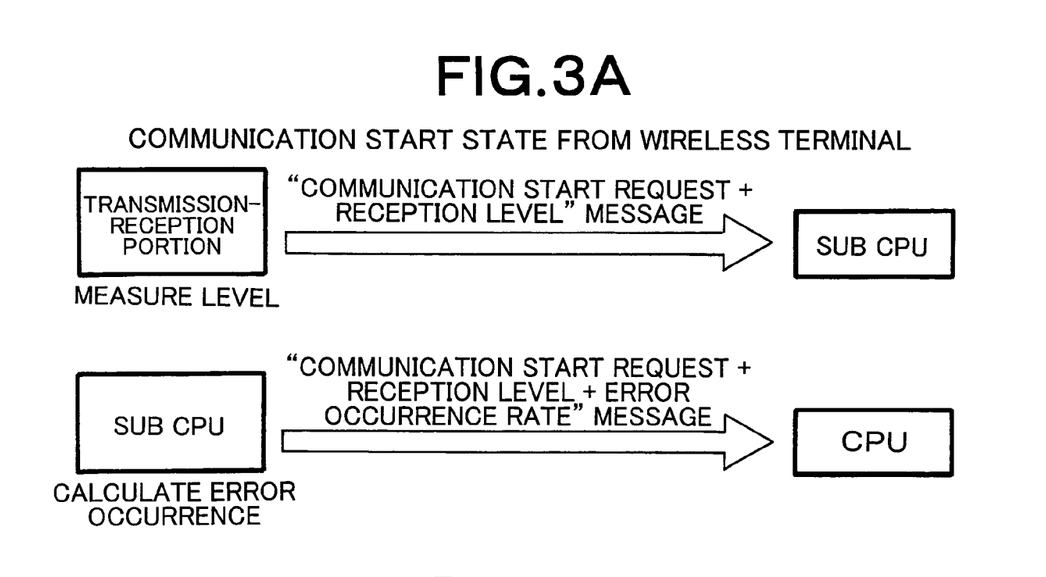
FIGS. 3A and 3B are diagrams showing signal messages among respective parts of the device.
Figure 3B:
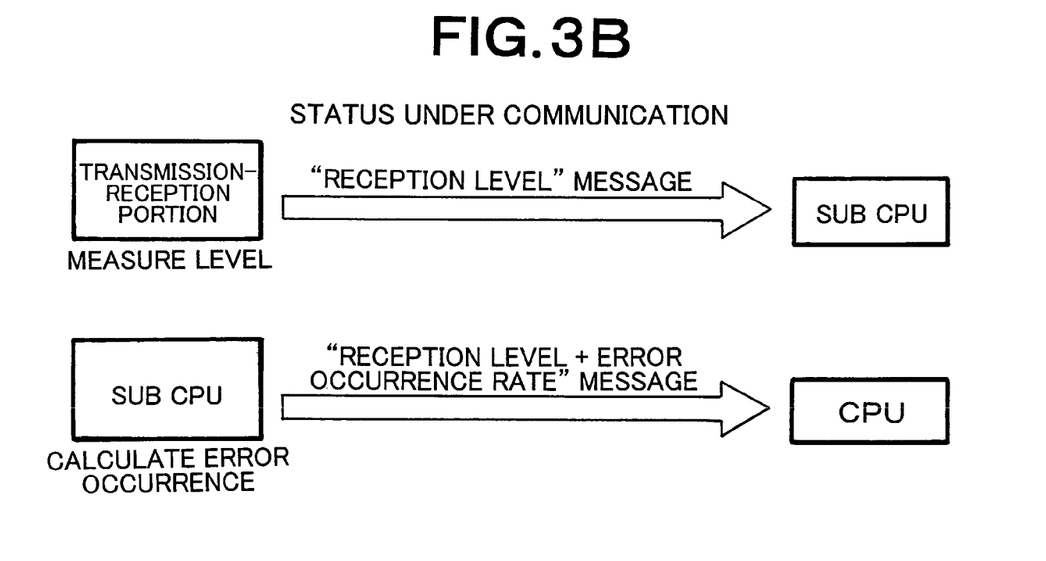

FIGS. 3A and 3B show signal messages among the respective parts of the device. First, in the case of a communication start request from a wireless terminal as shown in FIG. 3A, a message of the reception level measured by a transmission-reception portion is added with a communication start request and then a message "communication start request+reception level" is transmitted to sub CPU (Sub-CPU). If it is under the communication state, only the message of the reception level measurement is transmitted as shown in FIG. 3B.

As described above, the sub CPU has the function of calculating the communication error occurrence rate. In the case of the communication start request from the wireless terminal as shown in FIG. 3A, the sub CPU adds the message "communication start request+reception level" transmitted from the transmission-reception portion to a message of the communication error occurrence rate, and collectively transmits them as a message "communication start request+reception level+error occurrence rate" to CPU. Since there is no error before information communication is started, the initial value of the error is set to "0" (no error). On the other hand, under the communication state, only the message "reception level+error occurrence rate" is transmitted as shown in FIG. 3B.

Figure 4:
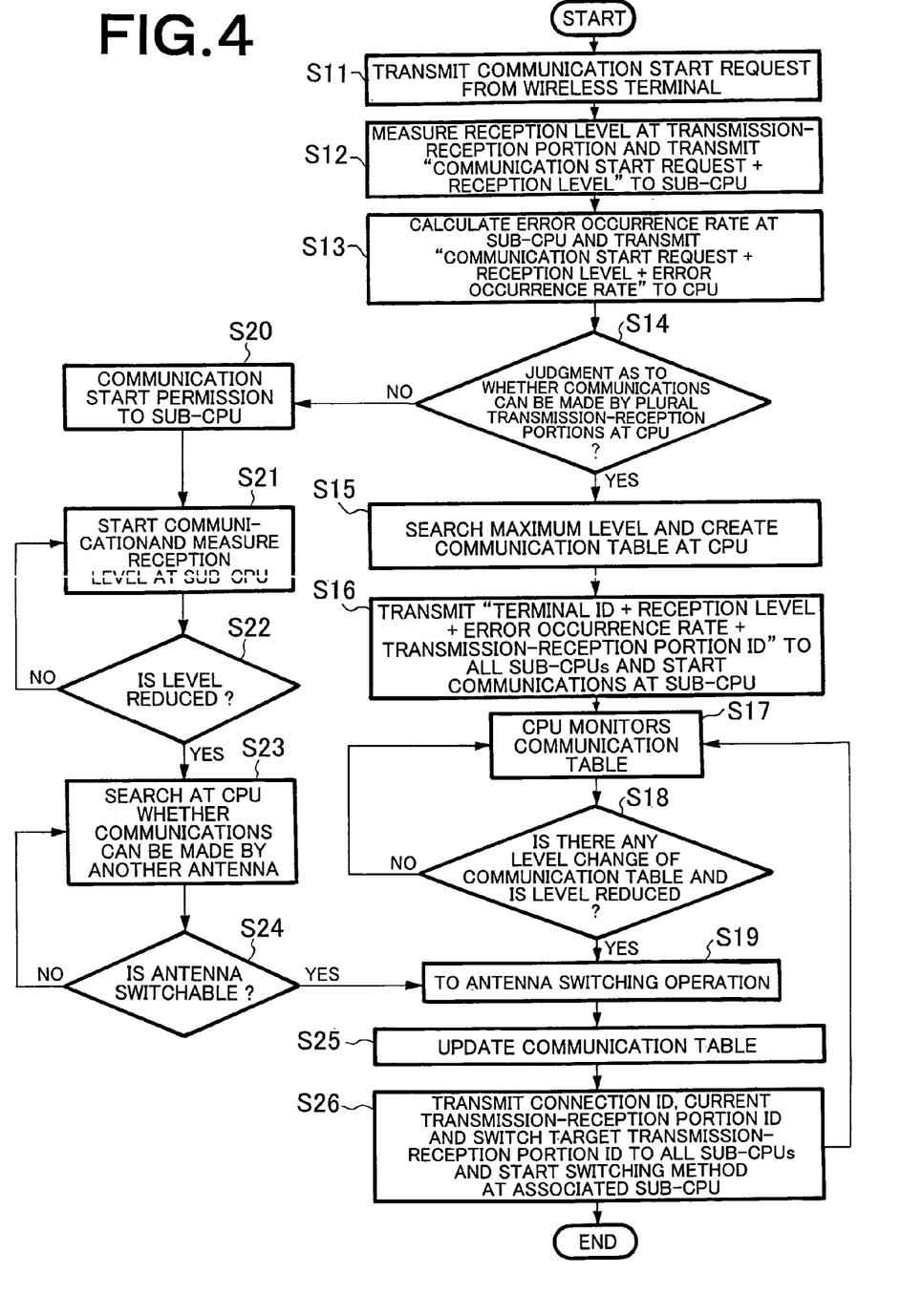
FIG. 4 is a flowchart showing the operation of the wireless LAN base station device.

The operation of the wireless LAN base station will be further described with reference to the flowchart of FIG. 4.

First, when the communication start request is transmitted from the wireless terminal (step S11), the reception level is measured at the transmission-reception portion, and the message "communication start request+reception level measurement" is transmitted from the transmission-reception portion to the sub CPU (Sub-CPU) (step S12). In an antenna electric wave arrival range which is not overlapped with any other antenna electric wave arrival range, the communication start request from the wireless terminal is received by only one transmission-reception portion. On the other hand, when the wireless terminal is located in an overlapped area of the antenna electric wave arrival ranges, the same communication request is received by plural transmission-reception portions.

Subsequently, the error occurrence rate is calculated at the sub CPU, and the message "communication start request+reception level+error occurrence rate" is transmitted to CPU (step S13).

Subsequently, it is judged by CPU whether the communications can be made by plural transmission-reception portions (step S14). When the communication start request from the wireless terminal is received by only one transmission-reception portion, "No" of FIG. 4 is judged, that is, it is judged that it is impossible to make communications by plural transmission-reception portions, and a message for communication start permission is transmitted to the sub CPU (step S20). On the other hand, when the communication start request from the wireless terminal is received by plural transmission-reception portions, "Yes" of FIG. 4 is judged, that is, it is judged that the communications can be made by plural transmission-reception portions, and owing to the search concerning maximum reception level, CPU creates a communication table shown in FIG. 5 on the basis of the information on the reception level from the wireless terminal and the error occurrence rate (step S15).

Figure 5:
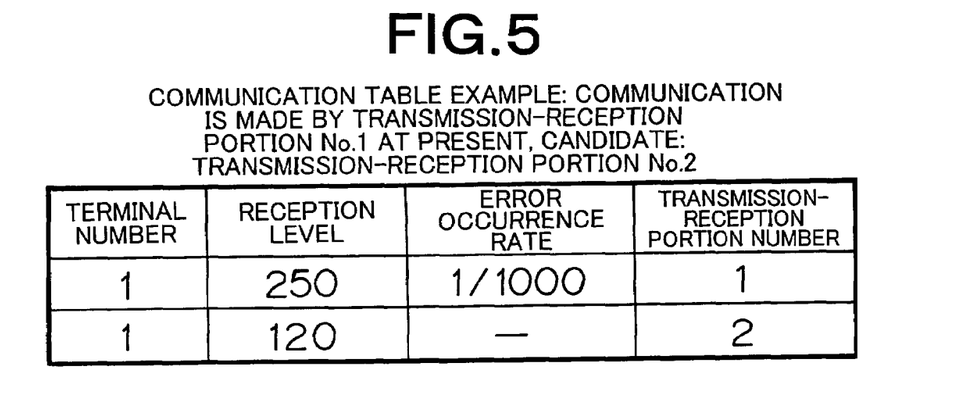
FIG. 5 is a diagram showing a communication table representing information on reception level and error occurrence rate from a wireless terminal.

As described above, when communications can be made with plural patterns at each wireless terminal, the communication table for the wireless terminal concerned is equipped. When communications can be made by a single antenna, it is unnecessary to create a communication table, and thus the memory capacity of CPU can be optimized.

According to the communication table described above, the communication start permission "terminal ID+reception level+error occurrence rate+transmission-reception portion ID" is notified to all the Sub-CPUs to make communications through the transmission-reception portion having the maximum level, and the communication is started at the maximum level (step S16).

The sub CPU is equipped with a function for updating the reception level and error occurrence rate under communication to the communication table. The reception level or error occurrence rate under the connection state is varied by movement of the wireless terminal, variation of electric wave intensity or the like, and in this case, the switching procedure of the antenna and transmission-reception portion is executed.

That is, in the case where the communication start request from the wireless terminal is received by only one transmission-reception portion and also the communications are started by the transmission-reception portion concerned, the reception level is measured by the sub CPU for controlling the transmission-reception portion concerned (step S21), and it is detected whether the reception level is reduced due to movement of the wireless terminal or the like (step S22). If the reception level is reduced ("Yes" in step S22), it is searched by using the communication table in CPU whether the communications can be made by another antenna (step S23), and it is judged whether the antenna switching operation can be performed (step S24). If the antenna switching operation is possible, the antenna switching operation is carried out (step S19). If the reception level is not reduced in step S22, the processing returns to the step S21. If it is judged in step S24 that it is impossible to carry out the antenna switching operation, the processing returns to the step S23.

On the other hand, in the case where the communication start request from the wireless terminal is received by plural transmission-reception portions and also the communications are started by the transmission-reception portion having the maximum reception level, CPU monitors the communication table (step S17). When the reception level of the communication table is changed and the reception level of the transmission-reception portion carrying out the communications is reduced ("Yes" of the step S18), the antenna switching operation is carried out (step S19).

Figure 6A:
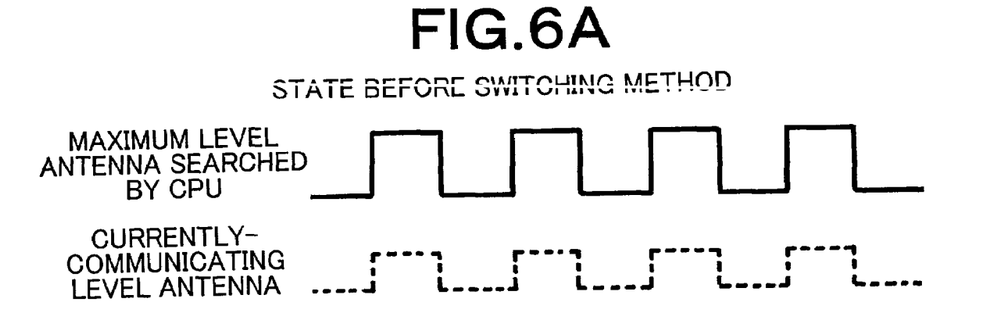
FIGS. 6A to 6C are diagrams showing switching of antennas.
Figure 6B:
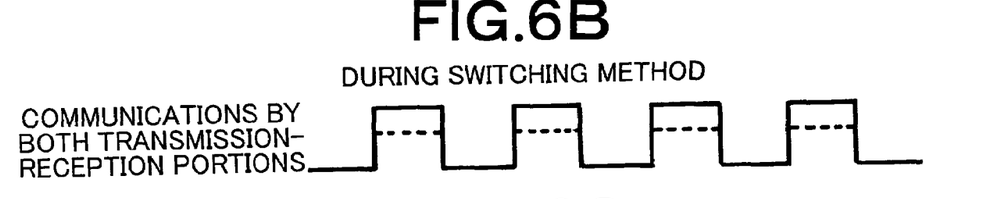
Figure 6C:
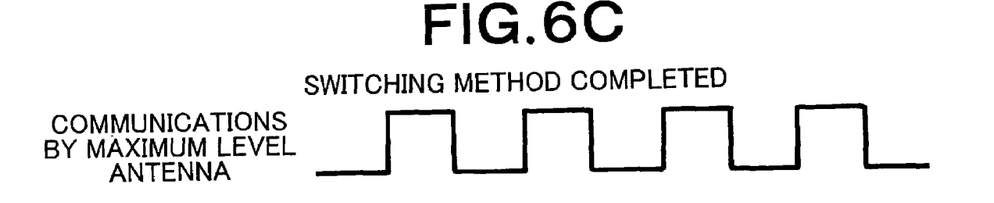

The communication table is updated (step S25), and "connection ID+current transmission-reception portion ID+switched transmission-reception portion ID" is transmitted to all the sub-CPUs (step S26). The Sub-CPU of the current transmission-reception portion and the sub-CPU of the transmission-reception portion after the switching operation are equipped with switching timers, and the communications are carried out by both of the transmission-reception portions at a timer interval as shown in FIG. 6. That is, during the switching period, the communications are made by using the transmission-reception portion carrying out communications and the switch target transmission-reception portion. After the switching period, the transmission/reception of the transmission-reception portion carrying out the communications is stopped, and the communications is made by the switch target transmission-reception portion. According to the above procedure, the wireless terminal and the device are synchronized with each other at all times, and thus there is such an effect that neither communication interruption nor out-of-synchronization occurs.

Figure 7:
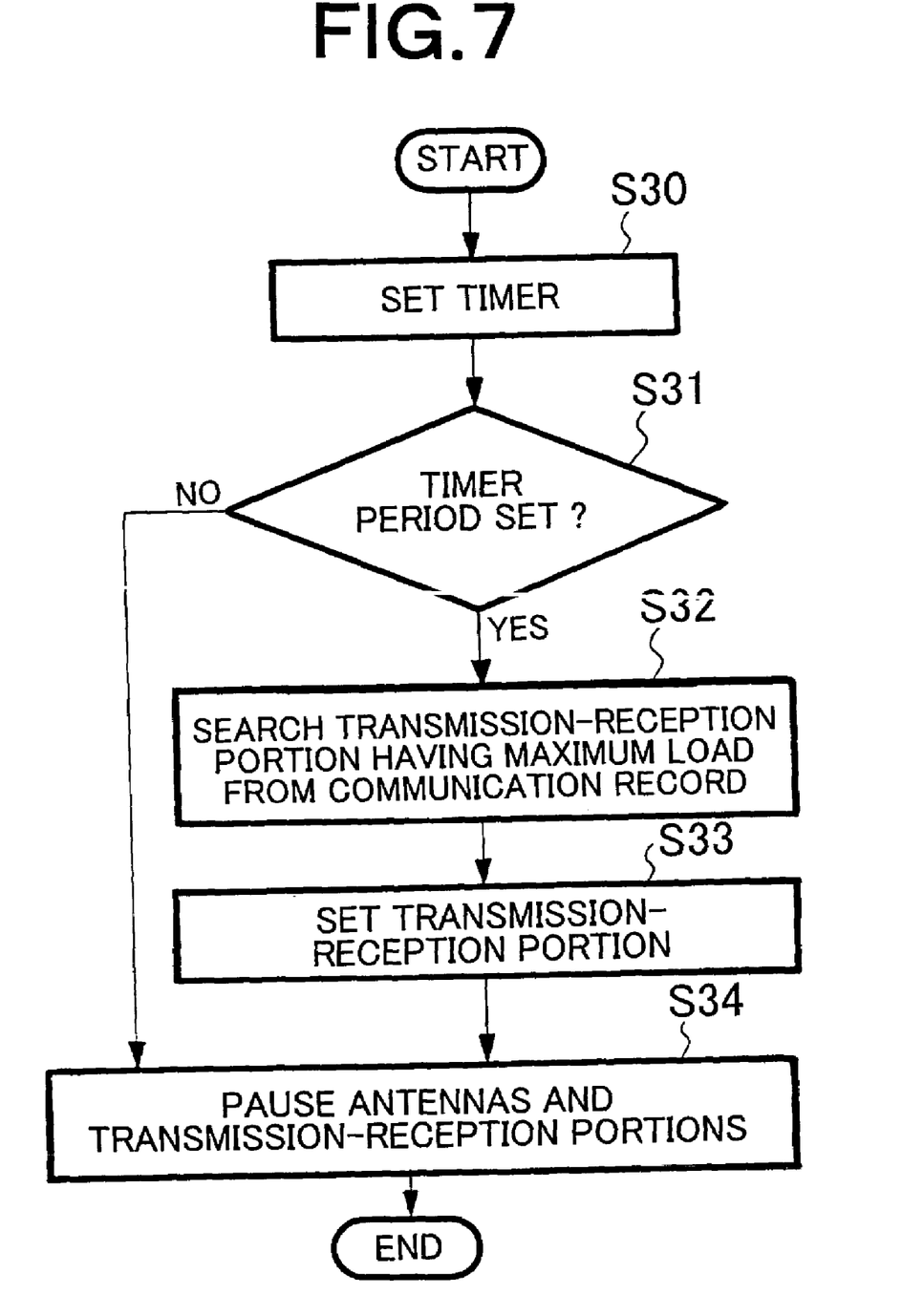
FIG. 7 is a flowchart showing the operation of the wireless LAN base station device.

Furthermore, in the night during which the communication load is small, a night timer is set in CPU and antennas and transmission-reception portions other than one antenna and one transmission-reception portion are paused (suspended) during a predetermined period as shown in the flowchart of FIG. 7. The pause (suspension) of the antennas concerned and the transmission-reception portions concerned may be carried out everyday by setting, or the antenna having the maximum load on that day may be set in the night.

The suspending operation corresponds to (1) an operation of turning off the power supply to the transmission-reception portions or (2) an operation of turning off the power supply to the transmitters in the transmission-reception portions and keeping the receivers on standby.

In FIG. 7, timer setting is carried out in CPU (step S30), and it is judged whether a timer period is set or not (step S31). If the timer period is set ("Yes" of step S31), the transmission-reception portion having the maximum load is searched on the basis of a communication record (step S32), a transmission-reception portion is set (step S33), and antennas and transmission-reception portions are paused (suspended) (step S34). Even when the period is not set in step S31, the antennas and the transmission-reception portions are suspended (step S34).

Examples of the construction of the wireless LAN base station device according the present invention will be described with reference to FIGS. 8 to 10. The number of sub devices in FIGS. 8, 9 and the number of antennas in FIG. 10 may be changed to another number as the occasion demands.

Figure 8:
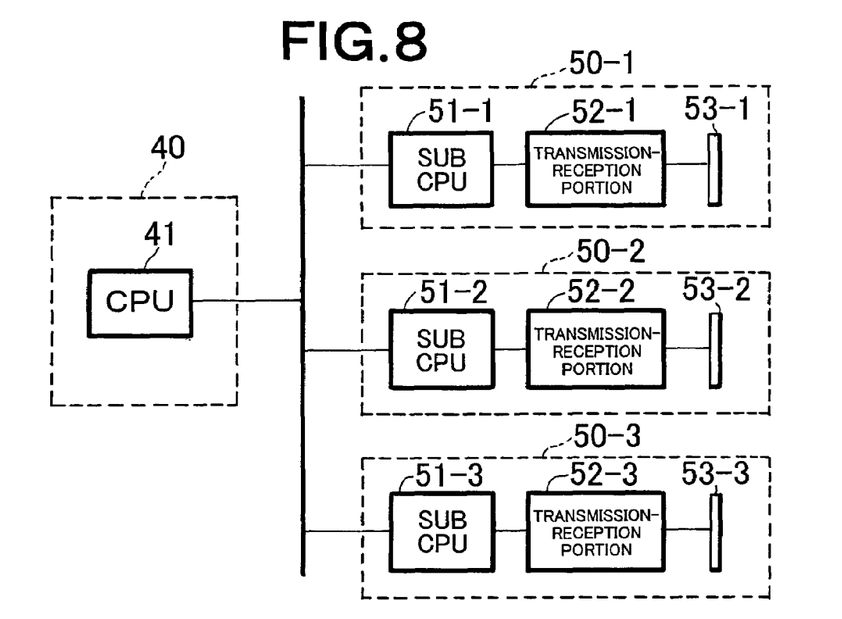
FIG. 8 is a diagram showing an example of the construction of the wireless LAN base station device according to the present invention.

The wireless LAN base station device of FIG. 8 comprises main device 40, and sub devices 50-1, 50-2, 50-3 connected to the main device 40 through an LAN cable. The main device 40 is equipped with CPU 41, and the sub devices 50-1, 50-2, 50-3 are equipped with sub CPUs 51-1, 51-2, 51-3, transmission-reception portions 52-1, 52-2, 52-3, and antennas 53-1, 53-2, 53-3, respectively. Synchronization is established by transmitting a master clock through a broadcast message from CPU 41. This example has an advantage that the parts can be connected through indoor wiring LAN connectors and the sub devices can be easily added to.

Figure 9:
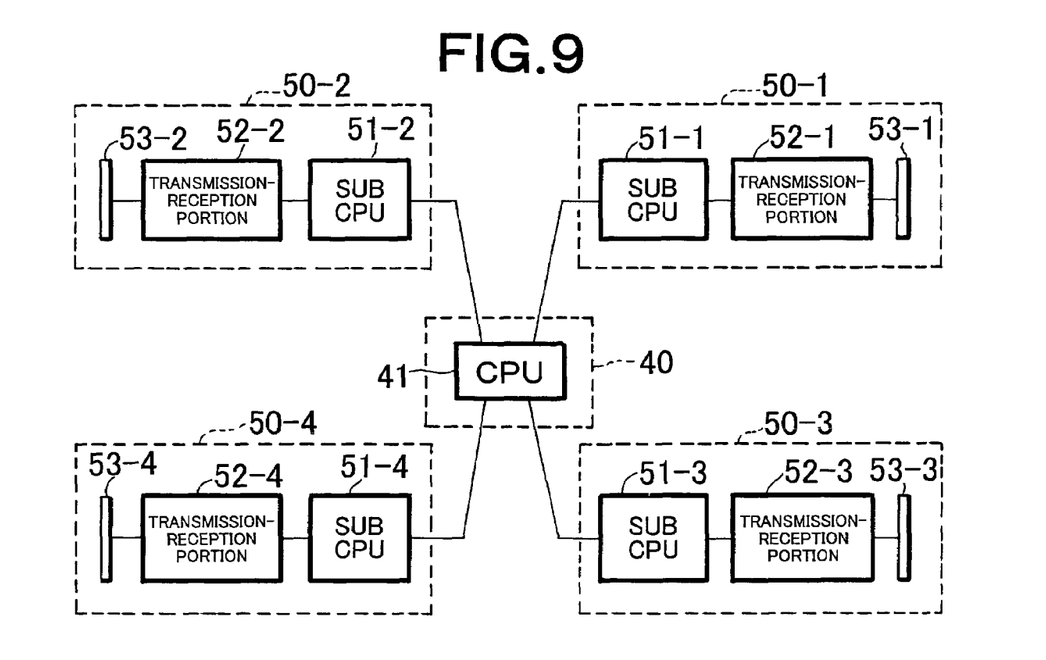
FIG. 9 is a diagram showing another example of the construction of the wireless LAN base station device according to the present invention.

In the wireless LAN base station device shown in FIG. 9, CPU 41 and each of sub-CPUs are connected to each other through a dedicated LAN cable in a star-type wiring arrangement. Synchronization is established by transmitting a master clock through a broadcast message from CPU 41. This example has an advantage that the connection is easy because the LAN cables are used. In this example, four sub devices, that is, the sub devices 50-1, 50-2, 50-3, 50-4 are equipped.

Figure 10:
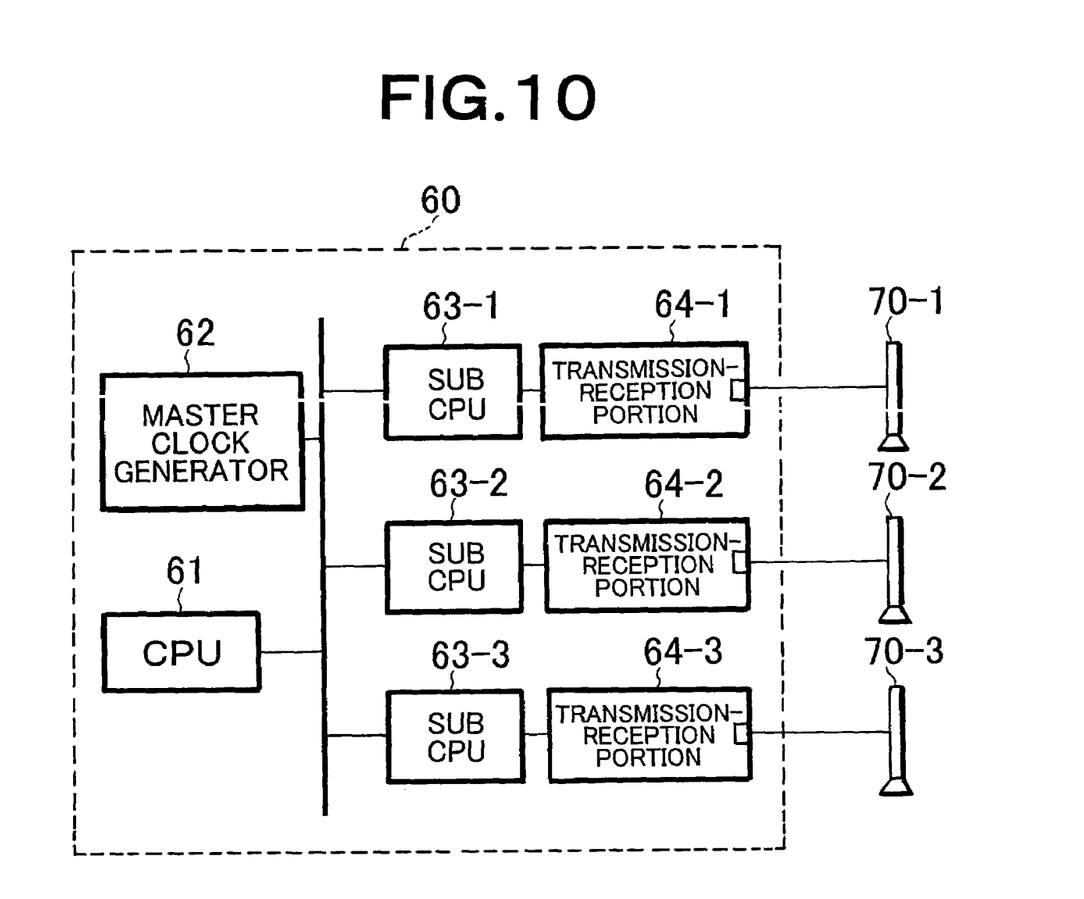
FIG. 10 is a diagram showing another example of the construction of the wireless LAN base station device according to the present invention.

A wireless LAN base station device shown in FIG. 10 comprises device 60 and antennas 70-1 to 70-3 connected to the device 60. The device 60 is equipped with CPU 61, master clock generator 62, sub CPUs 63-1 to 63-3, and transmission-reception portions 64-1 to 64-3, and the antennas 70-1 to 70-3 connected to the external interfaces of the transmission-reception portions 64-1 to 64-3. Communications between CPU 61 and the sub CPUs 63-1 to 63-3 are carried out through an internal bus. A wired LAN can be connected to the internal bus through an LAN connector.

As another construction to the constructions of FIGS. 8 to 10, the main device may be equipped with a master clock generator, CPU and sub CPU, and the sub device may be equipped with a transmission-reception portion and an antenna.

As described above, according to the present embodiment, a single wireless LAN base station device is equipped with plural antennas. Therefore, the communications can be made with the maximum reception level or/and the minimum error occurrence rate at necessary places. Furthermore, since plural antennas and plural transmission-reception portions are equipped, the wireless terminal can move with no interruption of communication by carrying out the antenna switching operation. Furthermore, the transmission-reception portion has the suspending function, and thus the power saving can be promoted.

What is claimed is:

1. A wireless LAN base station device serving as one base station, comprising:
   plural antennas for making communication with a wireless terminal, each of said plural antennas having at least a part of an electric wave arrival range which does not overlap with electric wave arrival ranges of the other antennas;
   plural transmission-reception portions connected to said plural antennas;
   plural control processors for controlling said plural transmission-reception portions; and
   a central processor for controlling said plural control processors,
   wherein each transmission-reception portion measures a reception level or/and each control processor measures a communication error occurrence rate, and said central processor controls said plural control processors to select said transmission-reception portion so that the reception level is maximum or/and the communication error occurrence rate is minimum.

2. The wireless LAN base station device according to claim 1, wherein said central processor controls said plural control processors to carry out a switching operation of said transmission-reception portions so that the reception level is maximum or/and the communication error occurrence rate is minimum, and transmission/reception is carried out between said wireless terminal and both of the transmission-reception portion carrying out the communications and the switch target transmission-reception portion during a switching period.

3. The wireless LAN base station device according to claim 2, wherein each of the plural control processors is equipped with a switching timer, and said transmission/reception of the transmission-reception portion carrying out the communications is stopped after the switching period.

4. The wireless LAN base station device according to claim 1, wherein said wireless LAN base station device is separated into a main device and sub devices, and said main device contains said central processor or said central processor and said plural control processors, and said sub devices contain said plural antennas, said plural transmission-reception portions and said plural control processors, or said plural antennas and said plural transmission-reception portions other than said central processor or said central processor and said plural control processors disposed in said main device.

5. The wireless LAN base station device according to claim 1, wherein said wireless LAN base station device is constructed by connecting said plural antennas to a device containing said central processor, said plural control processors and said plural transmission-reception portions.

6. A wireless LAN base station device serving as one base station, comprising:
   plural antennas for making communication with wireless terminal, each of said plural antennas having at least a part of an electric wave arrival range which does not overlap with electric wave arrival ranges of the other antennas;
   plural transmission-reception portions connected to said plural antennas;
   plural control processors for controlling said plural transmission-reception portions; and
   a central processor for controlling said plural control processors,
   wherein said central processor controls said plural control processors so that prescribed transmission-reception portions are paused for a time zone in which the communication load is low.

7. The wireless LAN base station device according to claim 6, wherein said central processor has a timer for pausing said prescribed transmission-reception portions for a predetermined period.

8. The wireless LAN base station device according to claim 6, wherein the transmission-reception portions to be paused are transmission-reception portions on which small communication load is imposed in a time zone other than a time zone in which the communication load is small.

9. The wireless LAN base station device according to claim 6, wherein said wireless LAN base station device is separated into a main device and sub devices, and said main device contains said central processor or said central processor and said plural control processors, and said sub devices contain said plural antennas, said plural transmission-reception portions and said plural control processors, or said plural antennas and said plural transmission-reception portions other than said central processor or said central processor and said plural control processors disposed in said main device.

10. The wireless LAN base station device according to claim 6, wherein said wireless LAN base station device is constructed by connecting said plural antennas to a device containing said central processor, said plural control processors and said plural transmission-reception portions.

11. A communication method for a wireless LAN base station device including plural antennas for making communications with a wireless terminal, plural transmission-reception portions connected to said plural antennas, and plural control processors for controlling said plural transmission-reception portions,
    said wireless LAN base station device serving as one base station,
    each of said plural antennas having at least a part of an electric wave arrival range which does not overlap with electric wave arrival ranges of the other antennas, and
    said method comprising a step of pausing prescribed transmission-reception portions by said control processors for a time zone in which the communication load is low.

* * * * *